US012729264B2

(12) United States Patent
Ahmadloo et al.

(10) Patent No.: US 12,729,264 B2
(45) Date of Patent: Sep. 8, 2026

(54) SULFUR CONTAINING POLYISOCYANATE POLYADDITION (PIPA) POLYOL WITH IMPROVED FLAME RETARDANT PROPERTIES AND FOAMS CONTAINING THEM

(71) Applicant: Dow Global Technologies LLC, Midland, MI (US)

(72) Inventors: Hamideh Ahmadloo, Horgen (CH); Paul Cookson, Cheadle (GB); Nasim Hooshyar, Terneuzen (NL); Nebojsa Jelic, Wangen (CH)

(73) Assignee: Dow Global Technologies LLC, Midland, MI (US)

( * ) Notice: Subject to any disclaimer, the term of this patent is extended or adjusted under 35 U.S.C. 154(b) by 408 days.

(21) Appl. No.: 18/546,841

(22) PCT Filed: May 19, 2022

(86) PCT No.: PCT/US2022/029991
§ 371 (c)(1),
(2) Date: Aug. 17, 2023

(87) PCT Pub. No.: WO2022/260841
PCT Pub. Date: Dec. 15, 2022

(65) Prior Publication Data

US 2024/0150516 A1 May 9, 2024

Related U.S. Application Data

(60) Provisional application No. 63/197,570, filed on Jun. 7, 2021.

(51) Int. Cl.

| | |
|---|---|
| ***C08G 18/10*** | (2006.01) |
| ***C08G 18/16*** | (2006.01) |
| ***C08G 18/18*** | (2006.01) |
| ***C08G 18/22*** | (2006.01) |
| ***C08G 18/24*** | (2006.01) |
| ***C08G 18/32*** | (2006.01) |
| ***C08G 18/38*** | (2006.01) |
| ***C08G 18/48*** | (2006.01) |
| ***C08G 18/66*** | (2006.01) |
| ***C08G 18/76*** | (2006.01) |

(Continued)

(52) U.S. Cl.
CPC ......... *C08G 18/3868* (2013.01); *C08G 18/10* (2013.01); *C08G 18/165* (2013.01); *C08G 18/1808* (2013.01); *C08G 18/1833* (2013.01); *C08G 18/222* (2013.01); *C08G 18/244* (2013.01); *C08G 18/3281* (2013.01); *C08G 18/4833* (2013.01); *C08G 18/6688* (2013.01); *C08G 18/7621* (2013.01); *C08J 9/125* (2013.01); *C08G 2110/0083* (2021.01); *C08J 2203/10* (2013.01); *C08J 2375/12* (2013.01)

(58) Field of Classification Search
CPC .. C08G 18/3868; C08G 18/10; C08G 18/165; C08G 18/1808; C08G 18/1833; C08G 18/222; C08G 18/244; C08G 18/3281; C08G 18/4833; C08G 18/6688; C08G 18/7621; C08G 2110/0083; C08G 2110/0008; C08G 18/2027; C08G 18/246; C08G 18/302; C08G 18/3206; C08G 18/4841; C08G 18/485; C08G 18/5045; C08G 18/6674; C08G 18/7614; C08G 18/5072; C08J 9/125; C08J 2203/10; C08J 2375/12
See application file for complete search history.

(56) References Cited

U.S. PATENT DOCUMENTS

| | | | |
|---|---|---|---|
| 4,225,481 | A | 9/1980 | Wagner |
| 5,587,448 | A | 12/1996 | Engen |

(Continued)

FOREIGN PATENT DOCUMENTS

| | | |
|---|---|---|
| WO | 2012154831 | 11/2012 |
| WO | 2018111750 | 6/2018 |

OTHER PUBLICATIONS

Wang, "A colorless, transparent and self-healing polyurethane elastomer modulated by dynamic disulfide and hydrogen bonds", New Journal of Chemistry, 2020, p. 5746-5754, vol. 44, No. 15.

(Continued)

*Primary Examiner* — K. Boyle

(57) ABSTRACT

The present invention provides a sulfur containing polyisocyanate polyaddition (PIPA) polyether polyol dispersion at a readily processible viscosity for use in making flexible polyurethane foams having inherent flame retardant properties that comprises a polyether polyol carrier and from 10 to 25 wt. %, based on the total weight of the dispersion, of particles of a sulfur containing polyisocyanate polyaddition (PIPA) polyether polyol having a particle size diameter (PSD), as determined by laser light scattering, of 90%, by volume, of the particles in the dispersion having a maximum PSD of from 0.2 to 4.5 μm and that, further, contain two or more aromatic carbamate groups. The dispersion may further comprise water or a blowing agent, g) one or more catalysts; and f) one or more polyisocyanates in a foam forming mixture. In addition, the present invention provides methods for making the sulfur containing PIPA polyether polyol dispersion comprising mixing polyol reactants under shear and delaying the addition of the sulfur containing polyol or extender reactant.

11 Claims, No Drawings

(51) Int. Cl.
*C08J 9/00* (2006.01)
*C08J 9/12* (2006.01)

(56) References Cited

U.S. PATENT DOCUMENTS

| | | | | |
|---|---|---|---|---|
| 6,881,783 | B1 * | 4/2005 | Verhelst | C08G 18/409<br>523/453 |
| 9,840,602 | B2 | 12/2017 | Cookson et al. | |
| 9,840,603 | B2 | 12/2017 | Cookson et al. | |
| 2007/0049720 | A1 | 3/2007 | Krause et al. | |
| 2014/0051778 | A1 | 2/2014 | Cookson et al. | |
| 2019/0284330 | A1 | 9/2019 | Porcelli et al. | |
| 2019/0300642 | A1 | 10/2019 | Ahmadloo et al. | |

OTHER PUBLICATIONS

PCT/US2022/029991 International Search Report and Written Opinion with a mailing date of Sep. 8, 2022.

* cited by examiner

SULFUR CONTAINING POLYISOCYANATE POLYADDITION (PIPA) POLYOL WITH IMPROVED FLAME RETARDANT PROPERTIES AND FOAMS CONTAINING THEM

The present invention relates to stable dispersions of polyether polyols containing sulfur and carbamate groups in a polyether polyol carrier for use in making flexible polyurethane foams having inherent flame retardant properties, to the foams themselves, and to methods of making the foams. More particularly, it relates to polyether polyol dispersions of polyisocyanate polyaddition (PIPA) polyol particles that contain sulfur, such as in the form of a disulfide, and that further contain carbamate groups, wherein the PIPA polyol particles have a particle size diameter (PSD), as determined by laser light scattering, of 90%, by volume, of the particles in the dispersion having a maximum PSD of from 0.2 to 4.5 μm, and is dispersed in a polyether polyol carrier, and, further wherein, the polyether polyol and the polyisocyanate polyaddition (PIPA) polyol particles in the stable dispersion reacts with a polyisocyanate to form polyurethane foams comprising non-migrating flame retardants and that exhibit improved inherent flame resistance or flame retardant (FR) properties.

Recent regulations require that FR improving substances that don't migrate out of the foam as opposed to added solid or liquid non-reactive flame retarding additives. Some dispersions known for enabling the making of polyurethane foams can provide foams that pass Crib 5 (British Standard BS 5852:2006) bulk flame fire tests without a flame retardant additive. Such foams thus may be said to provide some measure of inherent flame retardant properties. However, such known dispersions, including prepolymer dispersions, for example, Polyharnstoff Dispersion (PHD) polyols, as well as PIPA polyols, fail to provide foams having inherent FR properties in open ignition FR tests such as the CAL 117 test (Cal. State Technical Bulletin 117, 2000). Thus, there remains a need for foams having improved non-migrating flame retardant properties.

Unlike other known fire retardant polymer materials, such as styrene acrylonitrile (SAN) polymers which are essentially devoid of reactive sites, PIPA polyols carry significant numbers of functional groups that react readily with isocyanate components of a polyurethane foam making formulation and so react in to the foams made therefrom Thus, the PIPA particles participate in the foam curing reaction, thereby enabling solid materials which have inherent FR properties, i.e. in themselves, and enabling sustainable solutions in compliance with recent regulations. However, it would be desirable to improve PIPA polyol inherent FR properties and to remove or decrease FR additives in polyurethane foams.

Recently, US patent publication US20190300642A1 to Ahmadloo et al. has disclosed polyether polyols for making polyurethane foams comprising an isocyanate component and an isocyanate-reactive component including a sulfur containing polyether polyol that comprises an alkylated sulfur containing initiator for making polyurethane foams. The sulfur containing polyether polyol has a number average molecular weight from 400 g/mol to 10,000 g/mol. Ahmadloo et al. exemplify polyester polyols containing sulfur. A sulfur containing initiator has a number average molecular weight that is less than the number average molecular weight of the sulfur containing polyether polyol and can be, for example, thiodiethanol. The composition has a sulfur content from 0.1 to 3.0 wt. %, based on a total weight of the polyurethane foam forming composition. Ahmadloo et al. fail to disclose compositions wherein sulfur-containing species are dispersed as particles in a polyol carrier. Further. Ahmadloo et al. fail to disclose foams that exhibit inherent flame retardancy. Further, the Ahmadloo et al. foams exhibit an airflow of, for example, from 2.0 to 4.5 scfm, thereby suggesting that the foams are inadequate to provide inherent flame retardancy. Accordingly, there remains a need for a readily processed polyol composition suitable for making a polyurethane foam having inherent flame retardancy.

In accordance with the present invention, the present inventors have solved the problem of providing a polyol composition that enables the formation of a flame retardant polyurethane foam that comprises a non-migrating flame retardant and which exhibits both the bulk and open flame retardancy.

STATEMENT OF THE INVENTION

In accordance with the present invention, a sulfur containing polyisocyanate polyaddition (PIPA) polyether polyol dispersion of particles for use in making flexible polyurethane foams having inherent flame retardant properties comprises a polyether polyol carrier and from 10 to 25 wt. %, based on the total weight of the dispersion, of particles of a sulfur containing polyisocyanate polyaddition (PIPA) polyether polyol that, further, contain two or more carbamate groups, preferably, two or more aromatic carbamate groups, wherein the sulfur containing PIPA polyether polyol has a particle size diameter (PSD), as determined by laser light scattering, of 90%, by volume, of the particles in the dispersion having a maximum PSD of from 0.2 to 4.5 μm or, preferably, from 0.2 to 2.5 μm and, further wherein, the dynamic viscosity of the dispersion as determined in accordance ASTM D4878 (2015) at 25° C. ranges from 1500 to 5000 cP or, preferably, from 2000 to 3900 cP. The sulfur in the sulfur containing PIPA polyether polyol particles may comprise one or more sulfide groups, disulfide groups, or thiol groups, preferably, disulfide groups. The sulfur containing PIPA polyether polyol may further comprise phosphorous containing groups, such as phosphoesters. Further, the sulfur containing PIPA polyether polyol particles may comprise the condensation product of b) one or more compatible seed polyols as a particle dispersion having a particle size diameter (PSD), as determined by laser light scattering, of 90%, by volume, of the particles in the dispersion having a PSD of 10 μm or less, or, preferably, 5 μm or less, for example, a particulate branched polyether seed polyol containing two or more carbamate groups, in particular, a PIPA polyether seed polyol containing two or more aromatic carbamate groups. Still further, the sulfur containing PIPA polyether polyol particles may comprise, in condensed or copolymerized form, c) a co-reactant polyol containing a nitrogen atom and having an hydroxyl equivalent weight of up to 400, preferably, triethanolamine. Preferably, the polyether polyol carrier comprises a) one or more ethoxylated or oxyethylene end-capped polyols having a number average molecular weight of from 2000 to 12000, preferably, from 2500 to 7000, and an average hydroxyl functionality of from 2 to 8, or, more preferably, from 2 to 6, or, even more preferably, from 2.4 to 3.5. The preferred ethoxylated or oxyethylene end-capped polyether polyol carrier has an ethylene oxide content of at least 15 wt. %, or, preferably, up to 80 wt. %, based on the total weight of alkylene oxides or alkylene oxide containing reactants used to form the polyether polyol carrier.

The sulfur containing PIPA polyether polyol dispersion may further comprise water or a blowing agent, g) one or more catalysts, such as a tin catalyst or, preferably, a tin-free catalyst such as an amine catalyst, and f) as a separate component, one or more polyisocyanates, such as an aromatic polyisocyanate or aromatic diisocyanate, wherein a mixture of the sulfur containing PIPA polyether polyol dispersion and the separate polyisocyanate component comprises a foam forming mixture for making a flexible polyurethane foam. The foam forming mixture may have an isocyanate index of from 60 to 150.

Further, in accordance with the present, methods of making a polyisocyanate polyaddition (PIPA) polyether polyol dispersion comprises:

forming and reacting under shear a reaction mixture of a) one or more ethoxylated or oxyethylene end-capped polyols having a number average molecular weight of from 2000 to 12000, preferably, from 2500 to 7000, and an average hydroxyl functionality of from 2.4 to 3.5, or preferably, a nominal hydroxyl functionality of three, b) one or more compatible seed polyols as a particle dispersion having a particle size diameter (PSD), as determined by laser light scattering, of 90%, by volume, of the particles in the dispersion having a PSD of 10 μm or less, or, preferably, 5 μm or less, for example, a particulate branched polyether seed polyol containing two or more carbamate groups, in particular, a PIPA polyether seed polyol containing two or more aromatic carbamate groups, c) one or more co-reactant polyols having an hydroxyl equivalent weight of up to 400, preferably, containing at least one nitrogen atom, such as, preferably, an alkanolamine such as triethanolamine, d) at least one catalyst, such as a metal salt of a fatty acid or, preferably, a zinc fatty acid salt, e) one or more sulfur containing diol extenders, preferably, at least one disulfide containing diol, such as bis(hydroxyethyl) disulfide, and f) one or more polyisocyanate, preferably, an aromatic diisocyanate, to make the sulfur containing PIPA polyether polyol dispersion. Acceptable shear rates range from 8 to 60 $s^{-1}$, or, preferably, from 10 to 40 $s^{-1}$. Further, to provide PIPA polyether polyols for use in making high resilience foams, the polyols a), b), c) and e) in the reaction mixture may comprise at least 45 wt. %, or, preferably, at least 75 wt. % of primary hydroxyl groups, based on the total weight of hydroxyl groups in the polyols a), b), c) and e). The amount of the f) one or more polyisocyanate provides a composition with an isocyanate index of from 50 to less than 100, such as from 50 to 90, or, preferably, from 60 to 90.

Preferably, the method of making the sulfur containing PIPA polyether polyol dispersion takes place in two steps and comprises:

forming and reacting under shear a reaction mixture of a) one or more ethoxylated or oxyethylene end-capped polyols having a number average molecular weight of from 2000 to 12000, preferably, from 2500 to 7000 and an average hydroxyl functionality of from 2 to 8, or, more preferably, from 2 to 6, or, even more preferably, from 2.4 to 3.5, or preferably, a nominal hydroxyl functionality of three, b) one or more compatible seed polyols as a particle dispersion having a particle size diameter (PSD), as determined by laser light scattering, of 90%, by volume, of the particles in the dispersion having a PSD of 10 μm or less, or, preferably, 5 μm or less, for example, a particulate branched polyether seed polyol containing two or more carbamate groups, preferably, a PIPA polyether seed polyol, more preferably, a PIPA polyether seed polyol comprising two or more aromatic carbamate groups, and c) one or more co-reactant polyols having an hydroxyl equivalent weight of up to 400, more preferably, containing at least one nitrogen atom; and, adding after 50 to 240 seconds of the forming and reacting, preferably, after from 75 to 180 seconds, while continuing shearing, d) at least one catalyst, such as a zinc fatty acid salt catalyst, e) one or more sulfur containing diol extenders, and f) one or more polyisocyanate, preferably, an aromatic diisocyanate, and continuing mixing under shear until the exotherm of the homogeneous dispersion ceases. The amount of the f) one or more polyisocyanate provides the composition with an isocyanate index of from 50 to less than 100, such as from 50 to 90, or, preferably, from 60 to 90.

In another aspect of in accordance with the present invention, a flexible polyurethane foam having inherent flame retardant (FR) properties comprises the reaction product of a foam forming mixture of the sulfur containing polyisocyanate polyaddition (PIPA) polyether polyol dispersion, water or a blowing agent, g) one or more catalysts, such as a tin catalyst or, preferably, a tin-free catalyst such as an amine catalyst, and, f) as a separate component which is mixed with the sulfur containing PIPA polyether polyol dispersion, the g) one or more catalysts and the water or a blowing agent, one or more polyisocyanates, such as an aromatic polyisocyanate or aromatic diisocyanate. The foam forming mixture may have an isocyanate index of from 60 to 150.

The flexible polyurethane foam in accordance with the present invention exhibits one or more, or all, of (i) a Cal State Technical Bulletin 117, 2000 (CAL117) open flame Char length test rating of 10 cm or less, and (ii) a CAL 117, After Flame test with a rating of 5 s or less, and, further, the flexible polyurethane foam exhibits one or more, or all, of (i) a bulk flame Crib 5 British Standard BS 5852:2006 test standard (Crib 5), Time to Extinguish test rating of less than 600s, preferably, less than 450 s, (ii) a Crib 5, Weight Loss test rating of less than 60 g, (iii) a self-extinguishing material rating as determined in accordance with Crib 5, and (iv) a Crib 5, Burn through base rating of "No burn". Further, the flexible polyurethane foam in accordance with the present invention maintains a stable white color after more than 1-month direct exposure to sun light.

DETAILED DESCRIPTION OF THE INVENTION

The present invention provides polyether polyol dispersions comprising sulfur containing polyisocyanate polyaddition (PIPA) polyether polyol particles that enable the provision of flexible polyurethane foams, such as high resilience polyurethane foams, having improved flame retardancy properties. In addition, the present invention provides methods of making a polyether polyol dispersion comprising improving the reactivity of a PIPA polyether polyol by delaying the addition of the sulfur containing diol extender in making the polyether polyol dispersion. Because the sulfur containing PIPA polyether polyols comprise particles uniformly dispersed in a polyol, the foam products resulting from their reaction with polyisocyanates comprise a homogeneous dispersion of sulfur-containing material particles in the foam. The sulfur-containing material particles provide a flame retardant effect and are non-migrating because they are reacted into and form part of the foam matrix. The polyether polyol dispersion of the present invention enables one to provide tin-free polyurethane foams that pass both the bulk flame Crib 5 British Standard BS 5852:2006 test and the Cal 117 (2000) open flame tests. The polyether polyol dispersions also provide polyurethane foams that retain a stable white color after more than 1-month direct exposure to sunlight.

All ranges recited are inclusive and combinable. For example, a disclosed particle size diameter (PSD) (×90 by volume) of from 0.2 to 4.5 μm or, preferably, from 0.2 to 2.5 μm, would include a PSD (×90) of from 0.2 to 4.5 μm or, preferably, from 0.2 to 2.5 μm, or, of from 2.5 to 4.5 μm.

Unless otherwise indicated, conditions of temperature and pressure are ambient temperature (21-24° C.), a relative humidity of 50%, and standard pressure (1 atm).

Unless otherwise indicated, any term containing parentheses refers, alternatively, to the whole term as if parentheses were present and the term without them, and combinations of each alternative. Thus, as used herein the term, "(poly)diol" and like terms is intended to include the diol, a polymer or oligomer of the diol, and their mixtures.

As used herein, the term "ASTM" refers to publications of ASTM International, Conshohocken, Pa.

As used herein the term "CAL 117" refers to the Technical Bulletin 117, "Test Procedure and Apparatus for Testing the Flame Retardance of Resilient Filling Materials Used in Upholstered Furniture", State of California, Dept. of Consumer Affairs Bureau of Home Furnishings and Thermal Insulation, North Highlands, CA, March 2000 or the Cal State Technical Bulletin 117, 2000.

As used herein the term "Crib 5" refers to the upholstery filling test, ignition source 5, British Standard BS 5852: 2006, "Methods of test for assessment of the ignitability of upholstered seating by smouldering and flaming ignition sources", British Standards (BSI), London, UK, 2006.

As used herein, the term "component" refers to a composition containing one or more ingredients which is combined with another component to start a reaction, polymerization, foam formation or cure. Components are kept separate until combined at the time of use or reaction As used herein, the term "DIN" refers to publications of the Deutsches Institut fur Normung, the German Institute for Standardization, Berlin, Germany.

As used herein, the term "ISO" refers to the publications of the International Organization for Standardization, Geneva, CH.

As used herein, the term "dynamic viscosity" of the dispersion as determined in accordance ASTM D4878 (2015) using a Bohlin C-VOR Rheometer (Malvern, Worcestershire, UK) equipped with a DIN C25 coaxial cylinder having a bob diameter of 25 mm.

As used herein, the term "exotherm" refers to heat generated by a reaction that results in a rising or a least a steady elevated temperature (above room temperature) without the addition of any heat. As used herein, the term "hydroxyl number" in mg KOH/g analyte refers to the amount of KOH needed to neutralize the acetic acid taken up on acetylation of one gram the analyte material.

As used herein, unless otherwise indicated, the term "isocyanate index" or simply "index" refers to the ratio of the number of equivalents of isocyanate functional groups to the number of equivalents of hydroxyl groups in a given polyurethane forming reaction mixture, multiplied by 100 and expressed as a number. For example, in a reaction mixture wherein the number of equivalents of isocyanate equals the number of equivalents of active hydrogen, the isocyanate index is 100.

As used herein, the term "nominal hydroxyl functionality" refers to the number of hydroxyl groups in an ideal formula of a given diol or polyol, which is not respective of impurities or variability in the formula. The nominal hydroxyl functionality of a poly(oxyalkylene ether), for example, is two. The term "nominal hydroxyl functionality" and "formula hydroxyl functionality" can be used interchangeably. The term "average hydroxyl functionality" refers to the weight average of the nominal hydroxyl functionality of a mixture of hydroxyl functional compounds. For example, a 50/50 w/w mixture of ethylene glycol and glycerol has an average hydroxyl functionality of 0.5 (2 nominal OH groups in ethylene glycol)+0.5(3 nominal OH groups in glycerol) or 2.5.

As used herein, the term "number average molecular weight" or "$M_n$" of a given polyether polyol or polyol refers to the number average value taken from the weight distribution of the polyol as determined by 13C-NMR molecular identification, followed by gel permeation chromatography (GPC) of a 20 wt. % aqueous solution of the given polyol, calibrated using a polyether polyol standard, such as polyethylene glycol.

As used herein, the term "polyisocyanate" refers to an isocyanate group containing material having two or more isocyanate functional groups, such as a diisocyanate, or a biuret, allophanate, isocyanurate, carbodiimide, dimer, trimer or oligomer thereof made by reaction of an excess of isocyanate with one or more diols.

As used herein, the term "total solids" or "solids" refers to everything in a given composition other than water and volatile solvents which flash off or volatilize at below 40° C. and atmospheric pressure.

As used herein, the phrase "particle size" or "particle size diameter (PSD)" means the particle size diameter of a given material dispersion, as determined by laser light scattering, and is reported as the volume % of the particles in the dispersion having the specified maximum particle diameter.

As used herein, the term "×90" means the $90^{th}$ percentile of a given parameter measured or observed in a dispersion or distribution of a material.

As used herein, the phrase "wt. %" stands for weight percent.

In accordance with the present invention a polyisocyanate polyaddition (PIPA) polyether polyol polymer is dispersed as particles in a polyether polyol carrier in an amount of from 10 to 25 wt. %, based on the total weight of the dispersion. Each of the PIPA polyether polyol particles comprise the carbamylation or etherification residue of a sulfur containing diol extender, such as bis(hydroxyethyl) sulfide or bis(hydroxyethyl) disulfide (HES). Upon reaction with a polyisocyanate in a foaming reaction, the PIPA polyol dispersion in accordance with the present invention provides foams with non-migrating flame retardants, preferably, without any flame retardant (FR) additives.

The polyisocyanate polyaddition (PIPA) polyether polyol dispersion of the present invention comprises one or more polyether polyol carriers which are polyether polyols that also partially react into the PIPA polyether polyol and/or foam made therefrom. The polyether polyol carrier may comprise an a) ethoxylated or oxyethylene end-capped polyol, that has an ethylene oxide content of at least 15 wt. %, or, preferably, up to 80 wt. %, based on the total weight of alkylene oxides used to form the polyether polyol carrier. Such a polyether polyol may be a) an ethoxylated or oxyethylene end-capped polyol having a number average molecular weight ($M_n$) of from 2000 to 12000, preferably, from 2500 to 7000 and an average hydroxyl functionality of from 2 to 8, or, more preferably, from 2 to 6, or, even more preferably, from 2.4 to 3.5 groups, such as a nominal hydroxyl functionality of three. Mixtures of two or more of the foregoing initiators may be used. For example, the initiator may be glycerin. Suitable polyether polyol carriers include the product of oxyalkylene addition of an oxyalkylene feed in the presence of one or more initiators, such as a triol or a triamine, or a mixture of one or more initiators, such as a triol or triamine with one or more of a tetraol, tetramine, diamine or a diol, followed by advancing the product to the desirable number average molecular weight and ethylene oxide proportion by oxyethylene addition. Examples of suitable initiators include compounds with from two to four hydroxyl groups, primary amine groups, or secondary amine groups. Suitable initiators may include glycerin, trimethylolpropane, triethylolpropane, trimethylol ethane, triethanolamine, and other triols; suitable tetraols may include, for example, erythritol; suitable diols may include, for example, diols and diamines having a molecular weight of 120 or higher, or, 140 or, higher, such as monoesters of glycerol (mono-glycerides) and propane diamine. Catalysts for the addition reaction to form the ethoxylated or oxyethylene end-capped polyol can be anionic or cationic, such as potassium hydroxide (KOH), cesium hydroxide (CsOH), boron trifluoride, or a double metal cyanide complex (DMC) catalyst, such as zinc hexacyanocobaltate or a quaternary phosphazenium compound. When alkaline catalysts are used, they are preferably removed from the polyol at the end of production by a finishing step, such as coalescence, magnesium silicate separation or acid neutralization.

The polyisocyanate polyaddition (PIPA) polyether polyol dispersion of the present invention comprises particles of a PIPA polyether polyol containing sulfur. The sulfur containing groups in the sulfur containing PIPA polyether polyol may comprise sulfide groups or disulfide groups, preferably, disulfide groups. The PIPA polyether polyol may further comprise phosphorous containing groups which may enhance flame retardance. The PIPA polyether polyol may be the reaction product of a mixture of the polyether polyol carrier, a) one or more ethoxylated or oxyethylene end-capped polyols having a number average molecular weight ($M_n$) of from 200 to 12000, or, preferably, from 2500 to 7000, and an average hydroxyl functionality of three, b) a compatible seed polyol, preferably a PIPA polyether seed polyol, c) one or more co-reactant polyol, such as triethanolamine (TEOA) or diethanolamine (DEOA), d) at least one catalyst and, in the presence of, e) one or more sulfur containing diol extenders and f) one or more polyisocyanate, preferably, an aromatic diisocyanate.

In accordance with the present invention, the a) one or more ethoxylated or oxyethylene end-capped polyols can be any of the one or more polyether polyol carriers. Further, suitable polyether polyols as a) the ethoxylated or oxyethylene end-capped polyol may be any known in the art having the requisite hydroxyl functionality, viscosity, $M_n$, oxyethylene content (% EO) and OH # (mg KOH/g). Included are, for example, the polyether polyols obtained by addition polymerizing an oxyalkylene compound of from 2 to 4 carbon atoms, such as ethylene oxide or propylene oxide, onto a lower aliphatic polyhydric alcohols having an average of from 2 to 8, or from 2.5 to 4 hydroxyl groups, such as glycerol, triethanolamine, and trimethylolpropane, or a low molecular weight active hydrogen compound containing from 2.5 to 4 active hydrogen atoms, such as diethylene triamine, and followed, where the oxyalkylene is any other than oxyethylene, by extending the resulting product by addition of oxyethylene to reach the desired % EO and $M_n$.

Examples of suitable a) ethoxylated or oxyethylene end-capped polyols may include a poly(ethylene oxide-co-propylene oxide) copolymer triol (glycerin initiated) having 19 wt. % of ethylene oxide in the alkylene oxide feed, an hydroxyl number of 35.5, a primary hydroxyl content of approximately 88% and a hydroxyl equivalent weight (HEW) of 1580 ($M_n$~4750), or it may include a poly (ethylene oxide-co-propylene oxide) copolymer triol (glycerin initiated) having 70 wt. % of ethylene oxide in the alkylene oxide feed, a hydroxyl number of 34, a primary hydroxyl content of approximately 48% and an hydroxy equivalent weight of 1650 ($M_n$~4950). An example of a commercially available ethoxylated or oxyethylene end-capped polyol is available as a VORANOL™ polyol (The Dow Chemical Company).

Suitable amounts of the a) one or more ethoxylated or oxyethylene end-capped polyols may range from 71 to 90 wt. %, or, preferably, from 75 to 88.5 wt. %, based on the total weight of the reactants used to make the sulfur containing PIPA polyether polyol dispersion, with all total wt. % s adding up to 100%. Most of the one or more ethoxylated or oxyethylene end-capped polyols in the sulfur containing PIPA polyether polyol dispersion act as the carrier phase in the dispersion.

In accordance with the present invention, a suitable b) compatible seed polyol may be a PIPA polyether seed polyol formed by reacting at least one aromatic diisocyanate, described below, in the presence of an excess of polyol in a polyol mixture of (i) an ethoxylated or oxyethylene end-capped polyol or a triol initiator with alkylene oxide containing from 15 to 80 wt. % of ethylene oxide, based on the total weight of the alkylene oxide, and (ii) one or more co-reactant polyol having a nitrogen or phosphorus atom and a formula molecular weight of up to 400, or, preferably, up to 300, wherein the polyol mixture comprises at least 70 wt. % of the ethoxylated or oxyethylene end-capped polyol. To provide for seed polyols useful for making high resilience foams, the polyol mixture comprises polyols having at least 45 wt. % or, preferably, at least 75 wt. % or, preferably, at least 80 wt. % of hydroxyl groups in the polyol mixture as primary hydroxyl groups. The isocyanate index is kept below 100 to keep a PIPA forming co-reactant present in the seed polyol. The at least one polyisocyanate may be used to provide the composition with an isocyanate index of from 50 to less than 100, such as from 50 to 90, or from 60 to 90.

Suitable amounts of the b) one or more compatible seed polyols may range less than 5 wt. % or, preferably, from 2 to 4 wt. %, based on the total weight of the reactants used to make the sulfur containing PIPA polyether polyol dispersion, with all total wt. % s adding up to 100%.

In accordance with the present invention, the c) one or more co-reactant polyol may be a diol or triol or oligoether diol having a formula weight of 400 or less, such as triethanolamine (TEOA), or diethanolamine (DEOA). Suitable co-reactant polyols c) may include include diols, such as dihydric alcohols having a molecular weight from 62 to 399, especially the alkane polyols such as glycols, like ethylene glycol, propylene glycol, hexamethylene diol, low molecular weight alcohols containing ether groups such as diethylene glycol, triethylene glycol, dipropylene glycol, tripropylene glycol or butylene glycols; triols, such as glycerol, trimethylol propane or trimethylol ethane; or higher functionality alcohols, such as polyglycerine; and alkanolamines, such as monoethanolamine, diethanolamine, triethanolamine, triisopropanolamine, 2-(2-aminoethoxyethanol), diisopropanolamine, TEOA, DEOA and mixtures thereof. Other alkanolamines which may be considered include N-methylethanol-substituted alkanolamines, phenyldiethanolamines, and diglycol amines. Preferably, the c) one or more co-reactant polyols comprises an amine containing polyol.

Suitable amounts of the c) one or more co-reactant polyols may range from 7 to 18 wt. % or, preferably, from 8 to 15 wt. %, based on the total weight of the reactants used to make the sulfur containing PIPA polyether polyol dispersion, with all total wt. % s adding up to 100%. In accordance with the present invention, the e) one or more sulfur containing diol extenders may include any diol containing at least one sulfur atom, such as in the form of a sulfide, a disulfide, or a thiol, e.g. thiodiethanol. Suitable sulfur containing diol extenders may include, for example, a thiodiglycol (2,2 thiodiethanol), thioglycerol, 2,2'-thiodiethanol, 3,3-thiodipropanol, 3,6-dithia-1,8-octanediol, 3,5-dithia-1,7 heptanediol, 2,2-dithiodiethanol, bis(2-hydroxyethylthio) methane, 3-methylthio-1-propanamine, bis (2-hydroxyethyl) disulfide (HES), bis(hydroxyethyl) sulfide, or combinations thereof.

Suitable amounts of the e) one or more sulfur containing diol extenders may range from 1 to 8 wt. % or, preferably, from 1.5 to 6 wt. %, based on the total weight of the reactants used to make the sulfur containing PIPA polyether polyol dispersion, with all total wt. % s adding up to 100%. In accordance with the present invention, the f) one or more polyisocyanate, may comprise an aromatic diisocyanate, aromatic polyisocyanate or mixture of two or more of these. Examples of useful polyisocyanates in accordance with the present invention may include m-phenylene diisocyanate, toluene-2,4-diisocyanate, toluene-2,6-diisocyanate, naphthylene-1,5-diisocyanate, 1,3- and/or 1,4-bis(isocyanatomethyl) cyclohexane (including cis- and/or trans isomers), methoxyphenyl-2,4-diisocyanate, diphenylmethane-4,4'-diisocyanate, diphenylmethane-2,4'-diisocyanate, hydrogenated diphenylmethane-4,4'-diisocyanate, hydrogenated diphenylmethane-2,4'-diisocyanate, 4,4'-biphenylene diisocyanate, 3,3'-dimethoxy-4,4'-biphenyl diisocyanate, 3,3'-dimethyl-4-4'-biphenyl diisocyanate, 3,3'-dimethyldiphenyl methane-4,4'-diisocyanate, 4,4',4"-triphenyl methane triisocyanate, toluene-2,4,6-triisocyanate and 4,4'-dimethyldiphenylmethane-2,2',5,5'-tetraisocyanate. Diphenylmethane-4,4'-diisocyanate, diphenylmethane-2,4'-diisocyanate and mixtures thereof are herein referred to as "MDI". Toluene-2,4-diisocyanate, toluene-2,6-diisocyanate and mixtures thereof are generically referred to as TDI. Specific useful polyisocyanates may include MDI, TDI, diphenylmethane-4,4'-diisocyanate, diphenylmethane-2,4'-diisocyanate, toluene-2,4-diisocyanate, toluene-2,6-diisocyanate or mixtures thereof.

In the sulfur containing PIPA polyether polyol dispersion and the methods for making it, suitable amounts of the f) one or more polyisocyanate, preferably, an aromatic diisocyanate, range from the amount needed to provide an isocyanate index of from 50 to less than 100, such as from 50 to 90, or from 60 to 90. Keeping the isocyanate index below 100 insures the presence of active hydrogen groups in the product sulfur containing PIPA polyether polyol dispersion In accordance with the present invention, the PIPA polyether polyol dispersion reacts to form a polyether polyol particle population in the polyether polyol carrier without the addition of any tin containing catalysts. The resulting PIPA polyether polyol dispersion in accordance with the present invention has a solids content of from 10 to 25 wt. %, based on the weight of the polyether polyol dispersion. The PIPA polyether polyol particles in accordance with the present invention are uniformly distributed as a dispersion in the polyether polyol carrier and may have a particle size diameter (PSD), as determined by laser light scattering, of 90%, by volume, of the particles in the dispersion having a maximum PSD of from 0.2 to 4.5 μm or, preferably, from 0.2 to 2.5 μm. The dispersion of the PIPA polyether polyol in the polyether polyol carrier further has a stable dynamic viscosity as determined in accordance ASTM D4878 (2015) of from 1500 to 3950 cP at room temperature, preferably, from 2000 to 3900 cP.

In accordance with the methods of making a sulfur containing polyisocyanate polyaddition (PIPA) polyether polyol dispersion of the present invention, the forming and reacting of a reaction mixture under shear advances the PIPA polyether polyol and incorporates sulfur atoms into the particles of the polyether polyol until the exotherm of the homogeneous dispersion ceases. However, the e) one or more sulfur containing diol extender has been known to impede polymerization or polyol addition. Accordingly, the present inventors have invented a two-step reaction method wherein the a) ethoxylated or oxyethylene end-capped polyol, the b) one or more compatible seed polyol, such as a PIPA polyether seed polyol, and the c) one or more co-reactant polyols are combined under shear at a shear rate of from 8 to 60 $s^{-1}$, or, preferably, from 10 to 40 $s^{-1}$ to form a stable PIPA polyether polyol dispersion, followed by adding while continuing the high shear mixing the d) at least one catalyst, e.g. fatty acid metal salt catalyst, the e) one or more sulfur containing diol extender and f) one or more polyisocyanate until the exotherm of the homogeneous dispersion ceases.

The methods in accordance with the present invention are exothermic and may take place at ambient temperature without added heat. The forming and reacting of the reaction mixture may take place at from 10 to 70° C. The methods may further comprise controlling the exotherm by starting the reaction below room temperature or by carrying out the forming and reacting in a jacketed mixer equipped with a water-cooled jacket.

Because the reacting takes place quickly and results in a rapid increase in viscosity, the time for forming and reacting the reaction mixture generally remains less than 480 s, or, preferably, less than 420 s.

Preferably, the method of making the PIPA polyether polyol dispersion in accordance with the present invention comprises:

forming and reacting under shear at a rate of from 8 to 60 $s^{-1}$, or, preferably, from 10 to 40 $s^{-1}$ a reaction mixture of a) one or more ethoxylated or oxyethylene end-capped polyols having a number average molecular weight of from 2500 to 7000, preferably, from 4000 to 6000, and an average hydroxyl functionality of from 2.5 to 3.4, b) one or more compatible seed polyols as a particle dispersion having a particle size diameter (PSD), as determined by laser light scattering, of 90%, by volume, of the particles in the dispersion having a PSD of 10 μm or less, or, preferably, 5 μm or less, such as a PIPA polyether seed polyol, c) one or more co-reactant polyols having an hydroxyl equivalent weight of up to 400; and, after 50 to 240 seconds, preferably, after from 75 to 180 seconds, adding the d) at least one catalyst and e) one or more sulfur containing diol reactants while continuing the shearing until the exotherm of the homogeneous dispersion ceases. The d) at least one catalyst, the e) one or more sulfur containing diol extender and the f) one or more polyisocyanate are considered a part of the reaction mixture.

In accordance with the methods of the present invention, suitable amounts of the a) one or more ethoxylated or oxyethylene end-capped polyols may range from 71 to 90 wt. %, or, preferably, from 75 to 88.5 wt. %, based on the total weight of the reaction mixture, with all total wt. % s adding up to 100%.

In the and the PIPA polyether polyol dispersions in accordance with the methods present invention, suitable amounts of the b) one or more compatible seed polyols may range less than 5 wt. % or, preferably, from 2 to 4 wt. %, based on the total weight of the reaction mixture, with all total wt. % s adding up to 100%.

In the methods and the PIPA polyether polyol dispersions in accordance with the present invention, suitable amounts of the c) one or more co-reactant polyols may range from 7 to 18 wt. % or, preferably, from 8 to 15 wt. %, based on the total weight of the reaction mixture, with all total wt. % s adding up to 100%.

In the methods and the PIPA polyether polyol dispersions in accordance with the present invention, suitable amounts of the e) one or more sulfur containing diol extenders may range from 1 to 8 wt. % or, preferably, from 1.5 to 6 wt. %, based on the total weight of reaction mixture, with all total wt. % s adding up to 100%.

In the methods and the PIPA polyether polyol dispersions in accordance with the present invention, suitable amounts of the f) one or more polyisocyanate, preferably, an aromatic diisocyanate range from the amount needed to provide an isocyanate index of The isocyanate index is kept below 100 to keep a PIPA forming co-reactant present in the seed polyols. The amount of the at least one polyisocyanate may provide a composition with an isocyanate index of from 50 to less than 100, such as from 50 to 90, or, preferably, from 60 to 90.

In the methods and the PIPA polyether polyol dispersions in accordance with the present invention, to provide PIPA polyether polyols for use in making high resilience foams, the polyols a), b), c) and e) in the reaction mixture may comprise at least 45 wt. %, or, preferably, at least 75 wt. % of primary hydroxyl groups, based on the total weight of hydroxyl groups in the polyols a), b), c) and e).

In accordance with the methods of the present invention, the d) at least one catalyst may comprise any catalyst such as a tin containing catalyst or, preferably, a tin free catalyst. For example, the catalyst maybe a divalent metal salt catalyst, such as, for example, a zinc salt or zinc fatty acid catalyst, a bismuth salt, and/or a tertiary amine. The amount of catalyst used may be from 0.01 wt % to 1 wt % based on the total weight of the reaction mixture, with all total wt. % s adding up to 100%.

The sulfur containing PIPA polyether polyol dispersion in accordance with the present invention may be reacted with a polyisocyanate component, such as an aromatic diisocyanate, to form a polyurethane foam in a foam forming mixture. The foam forming mixture may further include, with the sulfur containing PIPA polyether polyol dispersion one or more foam forming additives or blowing agents, such as water. The polyisocyanate preferably comprises at least one diisocyanate, preferably an aromatic diisocyanate. Suitable polyisocyanates in the polyisocyanate component in the foam forming mixture are the same as the f) one or more polyisocyanate used in making the PIPA polyether polyol dispersion and are, preferably, an aromatic diisocyanate.

In the foam forming mixture in accordance with the present invention, the reaction of the PIPA polyether polyol and the one or more polyisocyanates to form a foam may be catalyzed. In accordance with the foam forming mixture of the present invention, the g) one or more catalysts in the PIPA polyether polyol dispersion component comprises a catalyst, such as an amine catalyst, such as a tertiary amine, for example, in the amount of from 0.1 to 1 wt. %, based on the total weight of the PIPA polyol dispersion. Preferably, the amine catalyst is a tertiary amine that volatilizes during reaction and thus functions in part as a blowing agent, for example, bis (N,N-dimethylaminoethyl)ether.

In accordance with the foam forming mixture of the present invention, foam forming additives may include at least one blowing agent. Such additives are generally combined with the sulfur containing PIPA polyether polyol dispersion as a component separate from the polyisocyanate component. Exemplary blowing agents include water, methylene chloride, carbon dioxide, and hydrocarbons. For example, water may be used in an amount from 1.0 to 7.0 wt. % (e.g., 2.5 to 5.0 wt. %), based on the total weight of the foam forming mixture. The foam forming additive may include at least one optional foam-stabilizing surfactant, e.g., that helps stabilize the gas bubbles formed by the blowing agent during the foaming process. For example, the foam-stabilizing surfactant may be a silicone surfactant known in the art (such as an organosilicone surfactant). The foam forming additive may include a chain extender, a cell opener, a filler (such as melamine and/or calcium carbonate), a pigment, a colorant, a reinforcing agent, a biocide, a preservative, an antioxidant, an autocatalytic polyol, and/or a catalyst (e.g., a blowing catalyst, a gelling catalyst, and/or a reactive catalyst).

The foams of the present invention find use in bedding and furniture, or padding therefore, such as pillows, mattresses and cushions for chairs and sofas as well as layers in the same, such as mattress toppers in European style mattresses.

EXAMPLES

The following examples illustrate the present invention. Unless otherwise indicated, all temperatures are ambient temperatures (21-24° C.), all pressures are 1 atmosphere and relative humidity (RH) is 35%. Notwithstanding that the numerical ranges and parameters setting forth the broad scope of the invention are approximations, numerical values set forth in the specific examples are reported as precisely as possible. Any numerical value inherently contains certain errors necessarily resulting from the standard variation found in their respective testing measurements.

The materials used in the Examples and not otherwise defined, below, are set forth in Tables 1 and 2, below. Abbreviations used in the examples include: DEOA: Diethanolamine; Dow: The Dow Chemical Company, Midland, MI; IPA; Isopropyl alcohol; PEG: polyethylene glycol; EO: Ethylene oxide; PO: propylene oxide; HEW: Hydroxyl equivalent weight.

TABLE 1

| Materials Used In Synthesis of PIPA Polyether Polyols And in Foam Forming | | | |
|---|---|---|---|
| Ingredient | General description | OH number | Functionality |
| Polyether Polyol 1 | EO capped polyol triol, primary OH = 88%, HEW = 1580 and EO % = 19; a VORANOL ™ polyol product (The Dow Chemical Company) | 35.5 | 3 |
| Seed Polyol (PSD (x90) ~ <2.5 m) | PIPA polyether polyol (13.6% EO, primary OH = 80%, from TDI 20 wt. % solids in Polyether polyol 1), | 62 | 3 |
| Triethanolamine (TEOA) | CAS NO. 102-71-6 \, Sigma-Aldrich, St louis, MO (99 wt. %) | 753 | 3 |
| bis (2-Hydroxy ethyl)disulfide (HES) | CAS Number 1892-29-1, Sigma-Aldrich 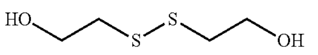 | 727 | 2 |
| 2,2'-Thiodiethanol (TEA) | Sigma-Aldrich CAS #111-48-8 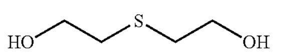 | 920 | 2 |
| Polyether Polyol 2 | EO capped polyol triol, primary OH = 48%, EO % 70%, HEW = 1650; a VORANOL ™ polyol product (The Dow Chemical Company) | 34 | 3 |
| Crosslinker | Blend of PEG 400, Sorbitol and urea with 25% water content (Evonik AG, Essen, DE) ORTEGOL ™ 204 resin | 645 | — |
| Isocyanate or TDI | A mixture of the 2,4 and 2,6 isomers of toluene diisocyanate in a ratio of 80% to 20%. % NCO = 48.23 (VORANATE ™ T-80 resin, Dow) | — | 2 |

Tables 3A and 3B, below, summarize the PIPA polyether polyol dispersion synthesis steps including timing of addition. To form the PIPA polyether polyol dispersions, the indicated ingredients were weighed separately and combined in a plastic container in the proportions and in the order and timing indicated and mixed at a shear rate of 1200 rpm or 20 $s^{-1}$ and is slowed to 500 rpm or 8.33 $s^{-1}$ after 4 minutes and continued until the temperature starts to drop. The polyether polyol was mixed together with the seed polyol, and TEOA and after 60 sec the pre-weighted TDI portion was added. The sulfur containing extender was added at the indicated time, including at 0 s, 60 s and 90 s. And the d) catalyst was added after a delay of 60 or 90 s. Catalyst addition was delayed During the process, a thermometer measured the exotherm to control the reactivity and timing was controlled to the second. The total amount of the PIPA polyether polyol dispersion made in each example was 500 g. Table 4, below, summarizes the observations made in the synthesis of the PIPA polyether polyol dispersions.

TABLE 2

| Additives Used In PIPA polyether Polyol Dispersion Synthesis And For Foaming | |
|---|---|
| Ingredient | Description |
| Silicone Surfactant 1 | Silicone surfactant used for viscoelastic TDI foams, TEGOSTAB ™ B8783 LF2 surfactant (Evonik) |
| Silicone Surfactant 2 | TEGOSTAB ™ 2370 surfactant (Evonik) |
| Amine Catalyst 1 | 70 wt. % bis-dimethylaminoethyl ether solution in dipropylene glycol (NIAX ™ A1 polyol, Momentive, Inc., Phila., PA) |
| Amine Catalyst 2 | 33 wt. % solution of triethylene diamine in dipropylene glycol (DABCO ™ 33LV catalyst, Evonik) |

TABLE 2-continued

| Additives Used In PIPA polyether Polyol Dispersion Synthesis And For Foaming | |
|---|---|
| Ingredient | Description |
| Tin Catalyst | Tin gelation Catalyst - stannous octoate catalyst, also known as tin(II) 2-ethylhexanoate (KOSMOS ™ 29 catalyst, Evonik) |
| Zinc Salt catalyst | VOC free zinc ricinoleate catalyst, OH#: 300 mg KOH/g, viscosity 1470 mPas as reported by mfgr. (KOSMOS ™ 54 catalyst, Evonik) |
| Isocyanate or TDI | A mixture of the 2,4 and 2,6 isomers of toluene diisocyanate in a ratio of 80% to 20%. % NCO = 48.23 (VORANATE ™ T-80 resin, Dow) |
| Liquid Flame Retardant | alkyl phosphate flame retardant containing Tris(2-chloroisopropyl) phosphate (FYROL ™ PCF-LO, ICL Group Ltd., Tel Aviv, IL) |

Test Methods: In the Examples that follow, several test methods were used which are identified in Tables 4 and 5, below, and/or in the following text. Unless otherwise stated, all tests were run three times and the average result was reported. Standard deviations in all data were within acceptable limits.

Color Stability: Color stability of the surface of the indicated foam samples was examined after exposing to the sun light over the specified period of time using a Chroma-Meter CR-210 (Konica Minolta) color measuring instrument and measuring Yxy (CIE 1931) or whiteness and the change in those parameters. A white color was selected for the calibration, with Y=94.2, x=0.3133, and y=0.3196. Color difference was measured as Δ(Yxy) and, individually, as $\Delta Y_w$, $\Delta x_w$, and $\Delta y_w$ in comparison with white color Y, x and y values. Y was reported and is the reflection percentage and shows the brightness or darkness of the color; and x and y shows the location of each color in chromatic diagram of C.I.E 1931. The darkness of the samples is reported as a quantitative numbering between 1 (best) to 10 (worst), based on the instrument color evaluation definitions.

Dynamic Viscosity (25° C.) refers to the viscosity as determined in accordance ASTM D4878 (2015) using a Bohlin C-VOR Rheometer (Malvern, Worcestershire, UK) equipped with a DIN C25 coaxial cylinder having a bob diameter of 25 mm.

PSD or PSD (×90) refers to the particle size diameter, as determined by laser light scattering, of a concentrated solution or dispersion of the analyte in IPA (20-30 ml IPA+0.5 g analyte) using a Beckman Coulter LS 13 320 particle size analyzer (Beckman Coulter, Brea, CA). PSD is reported as the diameter of particles in the dispersion at which 90%, by volume, are measured as having less than the specified particle diameter.

Solids Content: PIPA polyether polyol dispersions were analyzed by low-resolution pulsed NMR spectroscopy Quantization was performed by comparing the intensity of the NMR signal of the analyte with the intensity of the NMR signal of a corresponding unreacted mixture of the ethoxylated or oxyethylene end-capped polyol, and the co-reactant polyol and any sulfur containing diol extender. The signal intensities were determined at 70 μs. An absolute NMR reading was also performed independently to calibrate reference samples. The parameters summarized below in Table A were used to validate of the method and are provided only as guidelines for setting up the method. The solids content of the PIPA polyether polyol dispersions were calculated, as follows:

$$S = \left(1 - \frac{b'}{a'} \cdot \frac{dpol}{dPIPA}\right) \times 100\%$$

Where:

S=the solids content (% (w/w)) of the analyte;

b'=the signal (Volt) for the PIPA sample, corrected for the offset;

a'=the signal (Volt) for the polyol standard, corrected for the offset;

dpol=the density (g/cm$^3$) of the polyol standard; and, dPIPA=the density (g/cm) of the PIPA sample.

TABLE A

| NMR Parameter Guidelines | |
|---|---|
| Status: | |
| Serial No.: | ND2578 |
| MBox Temp. [C.]: | 40.003 |
| Temp. Err. [C.]: | 0.003 |
| Temp. Control: | ON |
| Parameters: | |
| Scans: | 25 |
| Rd [s]: | 5.00 |
| Gain [dB]: | 61 |
| Dig. Bw [Hz]: | 20000 |
| Ana. Bw: | broad |
| Offset Comp.: | off |
| Det. Mode: | magnitude |
| Magnitude Mode: | DIODE |
| Dig. Res. | fast |
| Dummy Shots: | 0 |
| Pulse Atten[dB]: | 0 |
| Gradient Unit: | none |
| Settings: | |
| 90 Pls.Len.[us]: | 1.84 |
| 180Pls.Len.[us]: | 3.76 |
| DetAngle.B[deg]: | 261 |
| DetAngle.N[deg]: | 265 |
| H Offs. [Steps]: | 438 |
| NMR Freq. [MHz]: | 19.950000 |
| Pulse Atten[dB]: | 0 |
| Instr.Gain [db]: | 61 |
| DeadTime [ms]: | 0.011 |
| Homog.Limit[ms]: | 0.50 |
| Instr. Rd [s]: | 1.50 |
| Stat Grad X [%]: | 0.00 |
| Stat Grad Y [%]: | 0.00 |
| Stat Grad Z [%]: | 0.00 |
| SFC: | no |

Whiteout time: Measures rate of development that particle size accelerates and refers to the time after addition of all materials into the reaction mixture in which the mixture turns from transparent to a white color. Acceptable results are 4 to 6 minutes or less. Results longer than 8 min normally lead to damaged polyol.

TABLE 3A

| PIPA Polyether Polyol Dispersion Synthesis | | | | | | | | | | |
|---|---|---|---|---|---|---|---|---|---|---|
| | Example | | | | | | | | | |
| | Comparative 1 | | Comparative 2 | | Comparative 3 | | Inventive 3 | | Inventive 4 | |
| Ingredient | Amount | Time to addition (s) | Amount | Time to addition (s) | Amount | Time to addition (s) | Amount | Time to addition (s) | Amount | Time to addition (s) |
| Polyether Polyol 1 | 78 | 0 | 78 | 0 | 78 | 0 | 78 | 0 | 78 | 0 |
| Seed Polyol | 2 | 0 | 2 | 0 | 2 | 0 | 2 | 0 | 2 | 0 |
| TEOA | 9 | 0 | 5.8 | 0 | 5.8 | 0 | 6.2 | 0 | 7.41 | 0 |
| TEA | 0 | 0 | 3.2 | 60 | 3.2 | 60 | 2.1 | 90 | 1.3 | 60 |
| Zinc Salt Catalyst | 0.2 | 60 | 0.2 | 60 | 0.2 | 90 | 0.2 | 90 | 0.2 | 90 |
| Isocyanate | 11.05 | 60 | 11.05 | 60 | 11.05 | 60 | 11.05 | 60 | 11.05 | 60 |
| Isocyanate Index | 71 | — | 71 | — | 71 | — | 71 | — | 71 | — |

TABLE 3B

PIPA Polyether Polyol Dispersion Synthesis

| Ingredient | Example | | | | | | | | | |
|---|---|---|---|---|---|---|---|---|---|---|
| | Comparative 1 | | Comparative 4 | | Comparative 5 | | Inventive 1 | | Inventive 2 | |
| | Amount | Time to addition (s) | Amount | Time to addition (s) | Amount | Time to addition (s) | Amount | Time to addition (s) | Amount | Time to addition (s) |
| Polyether Polyol 1 | 78 | 0 | 78 | 0 | 78 | 0 | 78 | 0 | 78 | 0 |
| Seed Polyol | 2 | 0 | 2 | 0 | 2 | 0 | 2 | 0 | 2 | 0 |
| TEOA | 9 | 0 | | 0 | 1.6 | 0 | 2.8 | 0 | 4.5 | 0 |
| HES | | n/a | 7.9 | 60 | 6.3 | 60 | 5.85 | 60 | 4.1 | 60 |
| Zinc Salt Catalyst | 0.2 | 60 | 0.2 | 60 | 0.2 | 90 | 0.2 | 90 | 0.2 | 90 |
| Isocyanate | 11.05 | 60 | 11.05 | 60 | 11.05 | 60 | 11.05 | 60 | 11.05 | 60 |
| Isocyanate Index | 71 | — | 71 | — | 71 | — | 71 | — | 71 | — |

TABLE 4

PIPA Polyether Polyol Properties and Synthesis Observations

| Observations | Example | | | | | | | | |
|---|---|---|---|---|---|---|---|---|---|
| | Comp. 1 | Comp. 2 | Comp. 3 | Inv. 3 | Inv. 4 | Comp. 4 | Comp. 5 | Inv. 1 | Inv. 2 |
| Whiteout time (s) | 10 | >600 | >450 | 15 | 6 | >600 | >400 | 48 | 60 |
| Reaction Temperature @ 1 min (° C.) | — | 56 | 51 | 60 | 10 | 58 | 54 | 56 | 53 |
| Reaction Temperature @ 5 min (° C.) | — | 58 | 54 | 61 | 60 | 52 | 43 | 51 | 50 |
| Mixing Time (min) | — | 15 | 15 | 4 | 6 | 15 | 20 | 5 | 5 |
| State (after mix)* | — | S | G | L | L | S | G | L | L |
| State (after 1 h)* | — | S | S | L-V | L | S | S | L | P |
| State (after 24 h)* | L | S | S | L-V | L-V | S | S | L | V |
| Dynamic Viscosity, 25° C. (mPas) | 2942 | N/A[1] | N/A[1] | 3768 | 4047 | N/A[1] | N/A[1] | 3654 | 3860 |
| OH number (mg KOH/g) | 60 | N/A[1] | N/A[1] | 49 | 58 | N/A[1] | N/A[1] | 57 | 55 |
| PSD (×90, μm) | 1.2 | N/A[1] | N/A[1] | 0.3 | 0.3 | N/A[1] | N/A[1] | 0.6 | 0.5 |
| Solid content (nmr, wt. %) (Nominal is 20~21%) | 14 | N/A[1] | N/A[1] | 20.8 | 21 | N/A[1] | N/A[1] | 12 | 11.2 |

*Visual observations: L—liquid, V—viscous, P—paste, S—solid, G—gel, B—blob.
N/A—not applicable as not measurable.

As shown in Table 4, above, Comparative Example 1 is a prior art formulation and stands as a benchmark for test and process parameters, such as physical properties and time intervals for addition of ingredients and overall process time. In Comparative Examples 2 and 3, TEOA was partly replaced with TEA and results in a dramatic decrease in the activation rate of the catalyst. As result, the whiteout time is extended significantly from 10 seconds for Comparative 1 to more than 450 seconds. The produced PIPA polyether polyol turns into a gel or solid after 24 hr. In Comparative Examples, 4 and 5, addition of the TEA at the same time with the catalyst overcomes the delayed reaction impact of sulfur. Using this method, the added amount of TEA can be increased. Inventive Example 2 shows a large amount of TEA in the reaction mixture while maintaining a single stage reaction method. Both of Inventive Examples 1 and 2 result in stable polyols with appropriate particle size and physical properties to produce foams. Both Inventive Examples 1 and 2 show higher viscosity and smaller particle size diameters than the Comparative Example 1. In Comparative Example 5, high amount of HES results in mixtures with very long white out time of more than 400 seconds. Comparative Examples 4 and 5 both result in solid polyether polyol dispersions. Formulations containing 2-Hydroxyethyldisulfide (HES) proved effective in accommodating the inventive process while also improving FR properties of resulting foams. In Inventive Examples 1 and 2, a stepwise decrease of HES content and partial replacement with TEOA with the HES gave acceptable foaming, Inventive Example 2 with a higher amount of HES had an improved polyol appearance over the Inventive Example 1. Surprisingly both Inventive Examples 1 and 2 only have a solid content of ca. 10 wt. %. Thus, perhaps an even higher amount of HES may be used when it is added in delayed fashion at the same time as the catalyst. In accordance with the present invention, a higher amount of sulfur has been introduced in the PIPA polyether polyol particles; and the improved properties of the final polyether polyol dispersion are with the scope of the present invention.

The PIPA polyether polyol dispersions accordance with the present invention and Examples, above, were used in foam formulations indicated in Table 6, below, and were tested in the manner indicated above and/or in Table 4, above, and Table 5, below. The foams were made according to a standardized hand-mix procedure wherein a FOAMAT™ Foam Qualification System (Format Messtechnik GmbH, Karlsruhe, DE) recorded foam-processing characteristics such as foam rise-height, reaction temperature and rise pressure. 20×20×20 cm boxes or 30×30×25 cm boxes (for Crib 5) were used. All ingredients with the exception of the isocyanate, and stannous octoate (tin catalyst) were stirred with a propeller mixer driven by a high shear mixer for 30 s at 3500 rpm. Then tin catalyst was added, and stirring was continued for an additional 10 s. After completing this 40 s mix time, TDI was added and stirred for an additional 10 s. The liquid material was then poured into the box. Rise time and settling were measured. After finishing the foam processing, prepared foam was post cured in at oven with warm air circulation at 413 K (140° C.) for 300 s. After removing from the oven, foams were crushed by hand and a relative rating for their tightness was assigned based on the needed crushing strength.

The foams were observed as enabling consistent processing and foam tightness.

TABLE 5

Foam Testing Methods

| Name of Test | Standard | Summary |
|---|---|---|
| Density core | ISO-845 | 2 Samples (100 × 100 × 50 mm) without skin |
| CFD | ISO-3386-1 | 2 Samples (100 × 100 × 50 mm) without skin |
| Tensile strength/ Elongation | ISO-1798 | 3 samples with 10-15 mm thickness cut at standard defined shape. |
| Tear strength | ISO-8067 | 3 samples size 125 × 25 × 25 mm |
| Resilience | ASTM-D3574-16 | 2 samples size 100 × 100 × 50 mm |
| Air flow | ISO-7231 | 3 samples size 51 × 51 × 25 mm, crushed before test |
| Compression set | ISO-1856 | 6 samples size 51 × 51 × 25 mm tested at 75%/and 90% RH for 22 h-at-70° C., measurements of recovered height after 30' |
| Wet compression set | ISO-13362 | 2 samples size 100 × 100 × 50 mm, 70% compressed, tested at 95% RH for 22 h/40° C./ measurements of recovered height after 15' |
| Flammability | CAL 177 with FIG. 117-A sample holder | 5 samples fresh and 5 samples aged; size305 × 76 × 12.7 mm |
| | BS5852 Crib 5 | White Fabric applied for cover, foams are crushed. Size: 450 × 450 × 75 + 450 × 300 × 75 mm__ |
| Viscosity | Bohlin Dynamic Viscosity | 25° C.; 1-60-1 Hz; 1 Hz/second |

TABLE 6

Foam Forming Mixtures

| Examples | PIPA Polyether Polyol | Comp. 6 | Comp. 7 | Inventive 5 | Inventive 6 |
|---|---|---|---|---|---|
| INGREDIENTS | | | | | |
| Total solids in PIPA polyether polyol in (nmr, wt. %) | | 10 | 20 | 11 | 12 |
| Polyether Polyol 1 | | 49.00 | | | |
| PIPA polyether polyol of C. Ex 1 | Comp.1 | 50.00 | 99.00 | | |
| Polyether Polyol 2 | | 1.00 | 1.00 | 1.00 | 1.00 |
| PIPA polyether polyol of Ex 4 | Inventive 4 | | | 99.00 | |
| PIPA polyether polyol Ex 1 | Inventive 1 | | | | 99.00 |
| Amine Catalyst 1 | | 0.03 | 0.03 | 0.03 | 0.03 |
| Amine Catalyst 2 | | 0.13 | 0.13 | 0.13 | 0.13 |
| DEOA 85% (w/w) | | 0.50 | 0.50 | 0.50 | 0.50 |
| Crosslinker | | 1.50 | 1.50 | 1.50 | 1.50 |
| Silicone Surfactant 1 | | 0.60 | 0.60 | 0.60 | 0.60 |
| Liquid Flame Retardant | | 5.00 | 5.00 | — | — |
| Tin Catalyst | | 0.17 | 0.17 | 0.17 | 0.10 |
| Water | | 1.80 | 1.80 | 1.80 | 1.80 |
| TDI | | 34.14 | 36.25 | 36.25 | 36.25 |
| Isocyanate Index | | 105 | 105 | 105 | 105 |

As shown in Table 7, below, the foams of Inventive Example 4 containing inventive the PIPA polyether polyol dispersions passed the CRIB 5 tests without other flame-retardant (FR) additives in the formulation. In the CAL 117 tests, the Inventive Example 4 foam passed the after flame and overall test. In the CAL 117 tests, the Inventive Example 3 foam achieved improved time to extinguish with no FR additive. The physical properties of the foam of Inventive Example 4 included improved tear strength and airflow.

TABLE 7

Foam Physical and Flame Retardant Properties

| Example | Comp. 6 | Comp. 7 | Inventive 5 | Inventive 6 |
|---|---|---|---|---|
| Physical Mechanical Properties | | | | |
| Density (kg/m$^3$) | 38.0 | 39.0 | 41.2 | 41.1 |
| CFD 40% (kPa) | 3.1 | 5.1 | 4.9 | 6.5 |
| CFD SAG | 2.6 | 2.7 | 3.1 | 3.2 |
| CFD Hysteresis (%) | 78.2 | 70.4 | 68.3 | 66.4 |
| Tensile strength (kPa) | 106.1 | 133.8 | 92.6 | 141.2 |
| Elongation (%) | 53.7 | 42.4 | 24.6 | 34.8 |
| Tear strength (N/m) | 255.4 | 306.3 | 233.7 | 365.4 |
| Resilience (%) | 56.3 | 45.5 | 47.3 | 48.5 |
| Air flow uncrushed (scfm) | 0.2 | 0.2 | 0.2 | 1.3 |
| Compression set 75% (%) | 5 | 6 | 53 | 11 |
| Compression set 90% (%) | 6 | 7 | 75 | 11 |
| Wet CS 70% (%) | 8 | 11 | 14 | 10 |
| Flammability Tests | | | | |
| Crib 5, Weight Loss/g (pass <60 g) | 39 | nm | nm | 47 |
| Crib 5, Drips/g | 5 | 0 | 10 | 5 |
| Crib 5, Self-extinguish | YES | NO | NO | YES |
| Crib 5, Time to Extinguish/s (pass <600 s) | 374 | 355 | 268 | 320 |
| Crib 5, Burn through base | YES | YES | YES | NO |
| Crib 5, Burn through back | NO | YES | YES | NO |
| Crib 5 Pass/Fail | PASS | FAIL | FAIL | PASS |
| CAL 117 Pass/Fail | PASS | FAIL | FAIL | PASS |
| CAL 117, Char length (cm) (Avg of 6 or less) | 8 | 15 | 10 | 7 |
| CAL 117, After flame (s) (Avg of 5 s or less) | 2 | 10 | 3 | 3 |

The Color stability of some foams made from foam forming mixtures in Table 6 after room temperature aging are reported in Table 8, below. The foams of Inventive Examples 5 and 6 exhibit superior anti-yellowing and color stability, especially in terms of AY in comparison to the conventional foam of Comparative Example 7.

TABLE 8

| Foam color parameters | Comp. 7 | Inventive 5 | Inventive 6 |
|---|---|---|---|
| Color Stability | | | |
| First day | | | |
| Y | 80.1 | 80.03 | 80.06 |
| Darkness level (1-10, 1 is best) | 1 | 1 | 1 |
| After 4 weeks | | | |
| Y | 60.54 | 71.04 | 78.06 |
| Darkness level (1-10) | 4 | 2 | 1~2 |
| After 8 weeks | | | |
| Y | 57.12 | 65.31 | 77.04 |
| Darkness level (1-10) | 6 | 2 | 1 |

The invention claimed is:

1. A sulfur containing polyisocyanate polyaddition (PIPA) polyether polyol dispersion for use in making flexible polyurethane foams having inherent flame retardant properties comprising a polyether polyol carrier and from 10 to 25 wt. %, based on the total weight of the dispersion, of particles of a sulfur containing polyisocyanate polyaddition (PIPA) polyether polyol that, further, contain two or more aromatic carbamate groups,
   wherein, the sulfur containing PIPA polyether polyol has a particle size diameter (PSD), as determined by laser light scattering, of 90%, by volume, of the particles in the dispersion having a maximum PSD of from 0.2 to 4.5 μm, and,
   further wherein, the dynamic viscosity of the dispersion as determined in accordance ASTM D4878 (2015) at 25° C. ranges from 1500 to 3950 cP.

2. The sulfur containing PIPA polyether polyol dispersion as claimed in claim 1, wherein the polyether polyol carrier comprises a) one or more ethoxylated or oxyethylene end-capped polyols having a number average molecular weight of from 2000 to 12000, and an average hydroxyl functionality of from 2 to 8.

3. The sulfur containing PIPA polyether polyol dispersion as claimed in claim 2, wherein the a) ethoxylated or oxyethylene end-capped polyether polyol carrier has an ethylene oxide content of at least 15 wt. % and up to 80 wt. %, based on the total weight of alkylene oxides or alkylene oxide containing reactants used to form the polyether polyol carrier.

4. The sulfur containing PIPA polyether polyol dispersion as claimed in claim 1, wherein the particles of the sulfur containing PIPA polyether polyol comprise one or more disulfide groups.

5. The sulfur containing PIPA polyether polyol dispersion as claimed in claim 1, wherein the particles of the sulfur containing PIPA polyether polyol further comprise, in condensed or copolymerized form, b) one or more compatible seed polyols as a particle dispersion having a particle size diameter (PSD), as determined by laser light scattering, of 90%, by volume, of the particles in the dispersion having a PSD of 10 μm or less.

6. The sulfur containing PIPA polyether polyol dispersion as claimed in claim 5, wherein the b) one or more compatible seed polyols comprises a PIPA polyether seed polyol.

7. The sulfur containing PIPA polyether polyol dispersion as claimed in claim 1, wherein the particles of the sulfur containing PIPA polyether polyol further comprise, in condensed or copolymerized form, c) one or more a co-reactant polyol containing a nitrogen atom and having an hydroxyl equivalent weight of up to 400.

8. The sulfur containing PIPA polyether polyol dispersion as claimed in claim 7, wherein the c) one or more co-reactant polyol in condensed or copolymerized form comprises triethanolamine.

9. The sulfur containing PIPA polyether polyol dispersion as claimed in claim 1, further comprising:
   water or a blowing agent;
   g) one or more catalysts; and,
   f) as a separate component, one or more polyisocyanates, wherein a mixture of the sulfur containing PIPA polyether polyol dispersion and the separate component comprises a foam forming mixture.

10. A method of making the polyisocyanate polyaddition (PIPA) polyether polyol dispersion as claimed in claim 1 comprising:
   forming and reacting under a shear of 8 to 60 $s^{-1}$ a reaction mixture of a) one or more ethoxylated or oxyethylene end-capped polyols having a number average molecular weight of from 2000 to 12000 and an average hydroxyl functionality of from 2 to 8, b) one or more compatible seed polyols as a particle dispersion having a particle size diameter (PSD), as determined by laser light scattering, of 90%, by volume, of the particles in the dispersion having a PSD of 10 μm or less, c) one or more co-reactant polyols having an hydroxyl equivalent weight of up to 400, d) at least one catalyst, e) one or more sulfur containing diol extenders, and f) one or more polyisocyanates, to make a sulfur containing PIPA polyether polyol dispersion.

11. The method as claimed in claim 10, comprising:
   forming and reacting under shear the reaction mixture of the a) one or more ethoxylated or oxyethylene end-capped polyols, the b) one or more compatible seed polyols as a particle dispersion having particle size diameter (PSD), as determined by laser light scattering, of 90%, by volume, of the particles in the dispersion having a PSD of 10 μm or less, and the c) one or more co-reactant polyols; and,
   adding to the reaction mixture after from 50 to 240 seconds of the forming and reacting, under continued shear of 8 to 60 $s^{-1}$, the d) at least one catalyst, the e) one or more sulfur containing diol extenders, and the f) one or more polyisocyanates in an amount that provides a composition having an isocyanate index of from 50 to less than 100 and continuing mixing under shear until an exotherm of the dispersion ceases.

* * * * *